United States Patent
Patel

(10) Patent No.: US 7,162,015 B1
(45) Date of Patent: Jan. 9, 2007

(54) AUTOMATED INFORMATION ACCESS VIA THE TELEPHONE LINE

(76) Inventor: Kanu Patel, 1316 Dunrobin Rd., Naperville, IL (US) 60540

(*) Notice: Subject to any disclaimer, the term of this patent is extended or adjusted under 35 U.S.C. 154(b) by 123 days.

(21) Appl. No.: 09/737,098

(22) Filed: Dec. 14, 2000

(51) Int. Cl.
*H04M 11/06* (2006.01)

(52) U.S. Cl. .............................. 379/88.18; 379/91.01; 379/93.18; 379/142.17; 455/456.4; 707/104.1

(58) Field of Classification Search ............... 379/67.1, 379/70, 93.23, 90.01, 142.05, 142.06, 142.15, 379/258, 218.01, 88.01, 93.12, 88.21, 211.02, 379/203, 88.19, 88.2, 211.01, 386, 355.1; 709/203; 714/46; 455/186.01, 406, 414.03, 455/186.1, 414.3; 707/1
See application file for complete search history.

(56) References Cited

U.S. PATENT DOCUMENTS

| | | | |
|---|---|---|---|
| 4,117,542 A | | 9/1978 | Klausner et al. |
| 4,135,662 A | * | 1/1979 | Dlugos ........................ 714/46 |
| 4,304,968 A | | 12/1981 | Klausner et al. |
| 4,313,035 A | | 1/1982 | Jordan et al. |
| 4,327,251 A | | 4/1982 | Fomenko et al. |
| 4,341,929 A | | 7/1982 | Alexander et al. |
| 4,577,062 A | * | 3/1986 | Hilleary et al. .......... 379/88.21 |
| 4,608,460 A | | 8/1986 | Carter et al. |
| 4,768,144 A | * | 8/1988 | Winter et al. ................... 707/1 |
| 4,847,890 A | | 7/1989 | Solomon et al. |
| 5,052,038 A | | 9/1991 | Shepard |
| 5,239,577 A | | 8/1993 | Bates et al. |
| 5,272,749 A | | 12/1993 | Masek |
| 5,440,541 A | | 8/1995 | Iida et al. |
| 5,521,966 A | * | 5/1996 | Friedes et al. ........... 379/91.02 |
| 5,524,141 A | * | 6/1996 | Braun et al. ........... 379/218.01 |
| 5,729,600 A | * | 3/1998 | Blaha et al. ........... 379/207.14 |
| 5,790,174 A | * | 8/1998 | Richard et al. .......... 379/93.12 |
| 5,878,118 A | | 3/1999 | Mohr |
| 5,901,214 A | * | 5/1999 | Shaffer et al. ......... 379/207.14 |
| 5,907,677 A | | 5/1999 | Glenn et al. |
| 6,040,921 A | * | 3/2000 | Hayashi et al. ............. 358/434 |
| 6,049,711 A | * | 4/2000 | Ben-Yehezkel et al. .. 455/414.3 |
| 6,078,660 A | * | 6/2000 | Burgess ...................... 379/386 |
| 6,246,983 B1 | * | 6/2001 | Zou et al. .................... 704/260 |

(Continued)

OTHER PUBLICATIONS

Roger L. Freeman, "Telecommunication System Engineering," 2nd Edition, A. Wiley-Interscience Publication, 1989, Published by John Wiley & Sons, Inc. p. 478(30), p. 524(3).

*Primary Examiner*—Gerald Gauthier
(74) *Attorney, Agent, or Firm*—Banner & Witcoff, Ltd.

(57) ABSTRACT

Disclosed is a method and apparatus for obtaining information from a remote database via a telephone network using an automated interactive system. Such information may include, for example, credit history information, address/telephone number information, and book availability information. The system includes a an automated call handler for receiving calls from the telephone, for receiving a request for information, for accessing the requested information, and for providing the requested information in accordance with the request, an audio controller providing outgoing audio messages from the call handler to the telephone, and a gateway coupled to the call handler and having a searchable database that may be accessed by the call handler. A user calls into the system and interactively with the system enters information via the telephone keypad using plurality of two-character responses. The system analyzes the plurality of two-character responses, converts them into an ASCII database search request, search for the requested information from a database, and provides an audio response to the user.

17 Claims, 10 Drawing Sheets

U.S. PATENT DOCUMENTS 6,253,069 B1 * 6/2001 Mankovitz ............... 379/93.12
6,411,686 B1 * 6/2002 Porter et al. ............. 379/88.18
6,411,803 B1 * 6/2002 Malackowski et al. ..... 455/406
6,446,111 B1 * 9/2002 Lowery ..................... 707/10
6,728,348 B1 * 4/2004 Denenberg et al. ...... 379/93.18

* cited by examiner

COMPREHENSIVE AUTOMATIC
REMOTE DATA ACCSS APPARATUS

CREDIT REPORT

BOOK AVAILABILITY INQUIRY

ADDRESS AND TELEPHONE NUMBER INQUIRY

REGISTRATION PROCESS

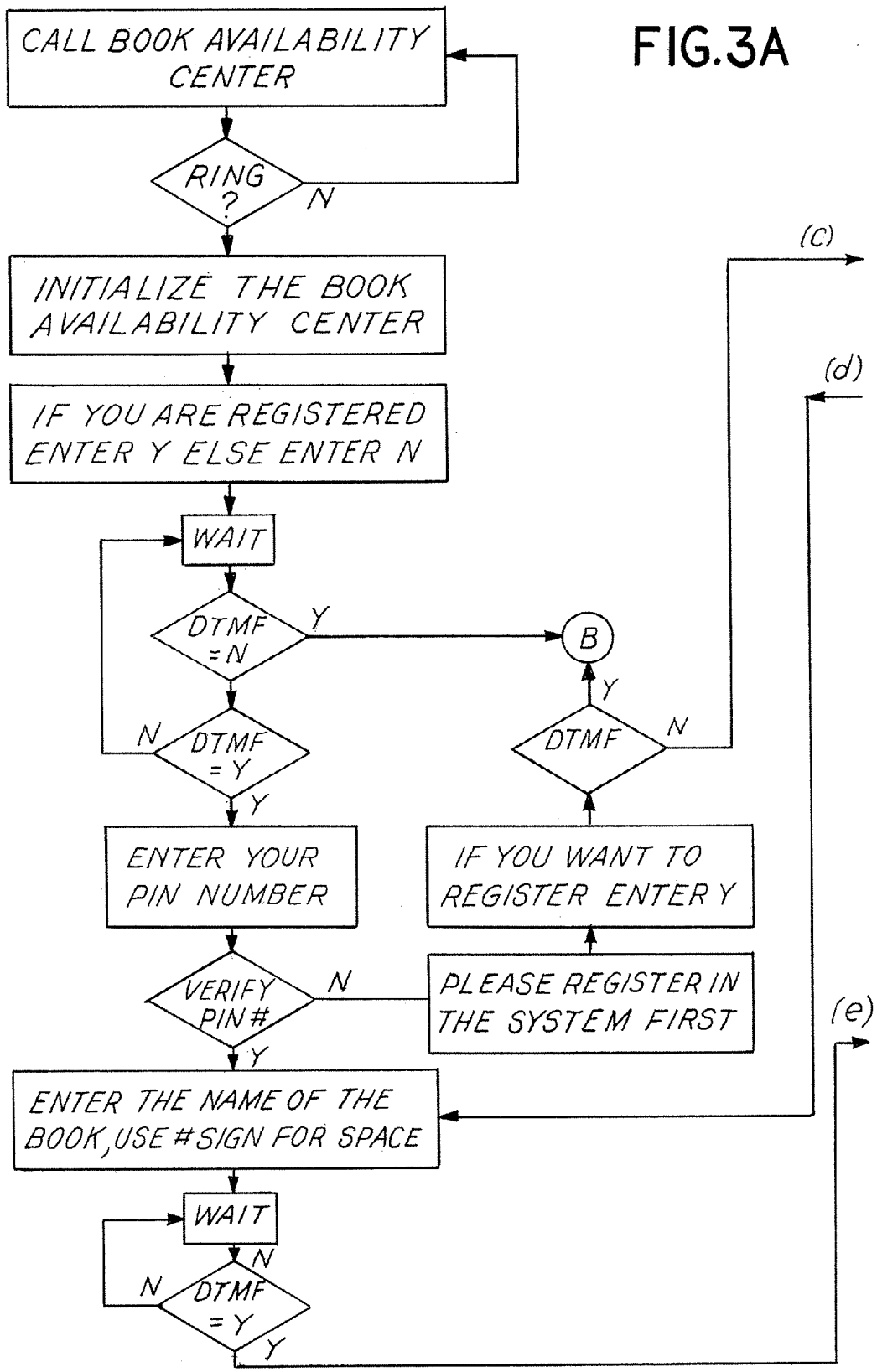

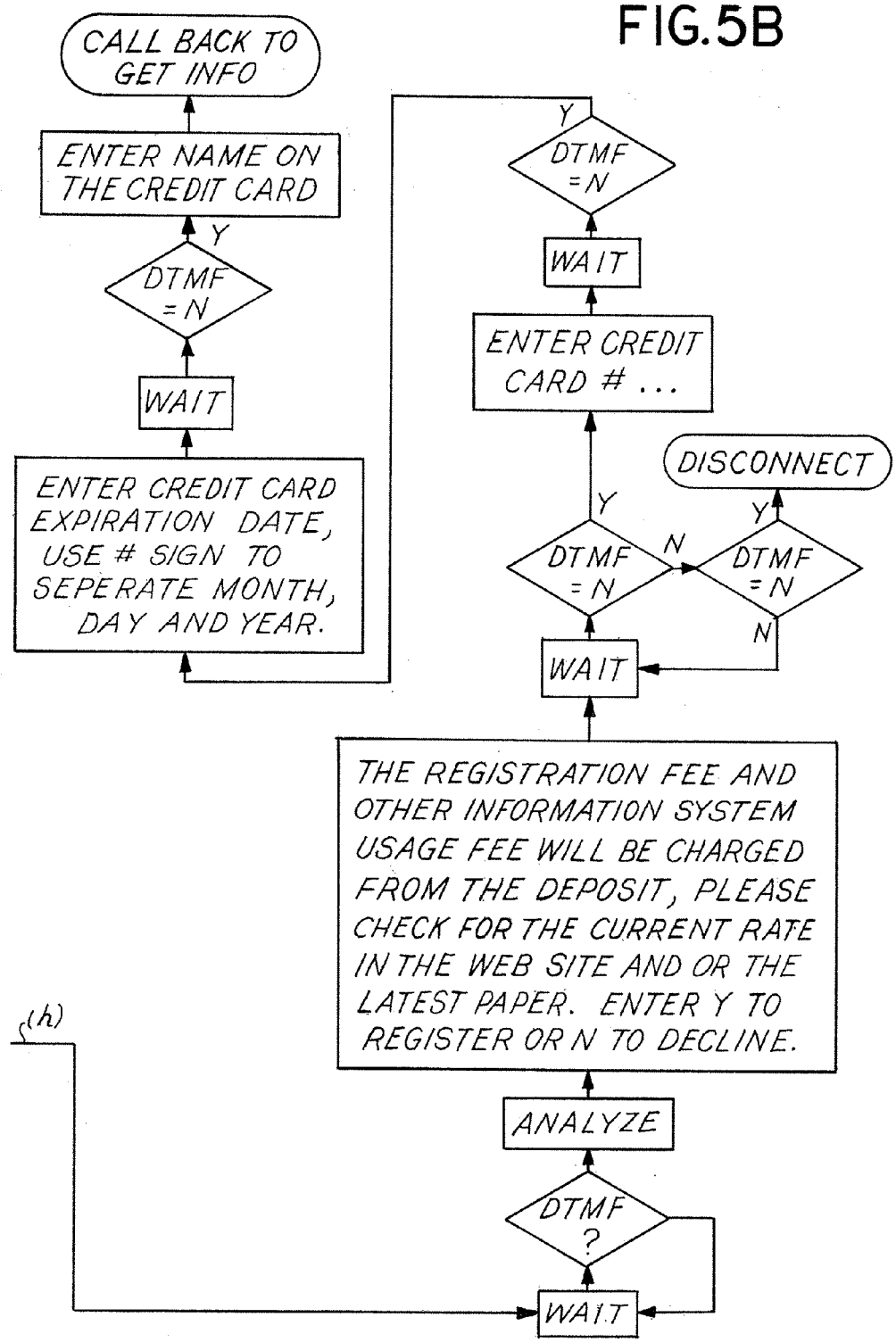

AUTOMATED INFORMATION ACCESS VIA THE TELEPHONE LINE

BACKGROUND OF THE INVENTION

1. Field of the Invention

This invention relates to automated telephone systems. More particularly, the invention relates to a method and apparatus within an automated telephone system for obtaining information from a remote database by entering a search via the keypad of a telephone.

2. Description of the Related Art

Directory assistance systems are available in the art to allow callers to access telephone information for businesses and other individuals. Generally, to obtain information, a user must call an information center where an operator answers the call, searches for the information in a stored database, and provides the required information to the user. In addition to the costs associated with requiring an operator to handle the calls, users may have to engage in long delays when the number of callers is greater than the number of operators answering the calls.

Automated systems are also available to provide various kinds of data searching to callers via the telephone. Examples of such systems include those disclosed in U.S. Pat. No. 4,608,460 (Carter); U.S. Pat. No. 4,577,062 (Helleary); U.S. Pat. No. 5,907,677 (Glenn); U.S. Pat. No. 5,052,038 (Shepard); U.S. Pat. No. 4,117,542 (Klausner); U.S. Pat. No. 4,304,968 (Klausner); U.S. Pat. No. 4,341,929 (Alexander); and U.S. Pat. No. 4,327,251 (Fomenko). These systems, however, have several drawbacks and are summarized as follows.

U.S. Pat. No. 4,608,460 discloses a automatic directory assistance apparatus having a means for receiving information from a caller via a specified number of DTMF signals, means for identifying another subscriber from the signals, and means for vocally conveying the information relating to the other subscriber to the caller and means, selectable by the caller, for connecting the caller with the other subscriber. This system, however, is limited to identifying a person's phone number and thereafter connecting to that number. Further, this patent is limiting since it merely asks for the first four letters of last name and the initial of the first name for the person whose number is desired. This is not practical in large cities since numerous people living in the same city will have the same last name and fist initial including for example people with the last name of Smith, Patel, Lee, Young, Smith, etc. By obtaining only four digits for the last name, there is a substantial risk of obtaining wrong matches or too many matches.

U.S. Pat. No. 4,577,062 discloses a system for obtaining certain types of information automatically from a changing data source. Such information may include, for example, locating a phone number and thereafter connecting to that number. This system obtains security information, however, it does not provide any teaching or disclosure of DTMF number punching. Further, it is limited to airport traffic, scheduling, and security systems.

U.S. Pat. No. 5,907,677 discloses a method for establishing anonymous communication links by anonymously connecting a first subscriber to a plurality of subscribers for communications. This system again fails to provide a system where information may be accessed from a remote database.

U.S. Pat. No. 5,052,038 discloses a system for obtaining certain information in a wide-area telephone system. This system, however, is limiting in that it is not an interactive system and it is not user-friendly. In particular, the user is required to enter numerous numbers in a specific way, thereby making the system susceptible to user error. The system also requires the user to punch the area code of the phone number requested. Further, the system is only limited to obtaining a phone number and connecting to that number.

U.S. Pat. No. 4,341,929 discloses a memory access system where certain data stored in an electronic memory is accessed by search electronics that permit identification and access to a selected memory location in response to a serial search character input. This system is limited in that it requires the use of a keyboard and number punching on the telephone will not work. Further, the system connects the caller to requested party directly and does not provide a phone number to the user.

U.S. Pat. Nos. 4,117,542 and 4,304,968 disclose electronic answering services that receive the DTMF inputs to provide the callers with the number and name of the desired party. These systems have limited memories such that they would be unable to handle a large number of names having same last name. Further, these systems are limited in that they only provide the phone number of a person and thereby connect to that number. Further, it requires the user to enter same number more than one time. For example to indicate the letter "B," the user must enter "2" twice; to indicate the letter "C," the user must enter "2" three times. This is likely to result in operator error if user forgets whether he/she entered the same number two or three times.

U.S. Pat. No. 4,327,251 discloses an automated telephone directory message system that is interactive with users over telephone lines and provides voice messages to callers where the user wishing to leave a message enters his user code number and numbers representing messages. This system is limited for use with large number of subscribers and it only finds the desired phone number and connects to that number.

Present systems are unable to provide automated information regarding credit reports, book availability status, addresses, phone numbers, etc.

For example, an individual's credit information is frequently required by realtors, credit card companies, investors, creditors, banks, loan/mortgage companies, landlords, etc. To get this information, one typically needs to drive to a credit-reporting agency, fill out the application, and wait for the operator or clerk to find the information for them. This process is inconvenient and time-consuming.

As another example, information about the availability of a library book requires the person to either drive to or call a library. The librarian thereby checks on the availability of the book by a computer system. Again, this is time-consuming and resource-intensive.

Though such information such as address information may be accessed via the Internet, it nonetheless requires access to the Internet, which may not be available for all users. Further, the user may be in a remote location and cannot readily access the Internet.

From the above information, it is clear that there is a need for an apparatus and a method that provides credit card information, books status inquiry, addresses, phone number, etc. with minimum effort and expense to the user.

SUMMARY OF THE INVENTION

This invention is a method and apparatus for obtaining particular information interactively from a remote database via an automated telephone system. Particularly, the present invention allows users to obtain credit history information, book availability information, and telephone/address information.

In a preferred embodiment, the system of the present invention generally includes a call handler, an audio controller, a plurality of modems, and a gateway terminal. The gateway terminal generally includes a data analyzer, a data search analyzer, a security checker, and a database server. The database server may store the various information that is to be searched and provided to the user. Such information may include, for example, an individual's credit history report, book availability status, and individual or business addresses. The database can be updated periodically. Users may thereby access the information stored in this database using an automated telephone system.

The user accesses the database by calling into the system and entering specific information on the telephone keypad as asked by the system. The user enters the data as queried interactively by the system. For example, the system asks the user to enter the first name, the last name, the book name, or the address, as needed, one item at a time. To get credit history report information, a credit report center system asks the user to enter the first name of the person whose credit is requested, then the last name, and finally social security number. This way, mistakes in punching numbers can be avoided.

A call handler receives the entered digits and forwards them to a digit analyzer. The digit analyzer analyzes the digits, converts them to into ASCII format, and forwards the ASCII information to a data search handler. An audio response unit responds to the user and prompts the user to enter specific information, for example, the first name, the last name, etc.

The call handler forwards the information that is entered by the user to a data search handler. The data search handler searches for user's request within a database and forwards the desired information to the audio response unit. For each piece of data stored in the database, a corresponding audio response is also stored in the database. The data search handler also forwards this corresponding audio response to the audio response unit, which then issues the audio response to the user.

It is an objective of the present invention to provide a user-friendly, interactive, fully-automated, and economical system to obtain information through the telephone system. The system may be accessed from any telephone line.

These and other objects, features, and advantages of the invention will be apparent from the ensuing description in conjunction with the accompanying drawings.

DESCRIPTION OF THE DRAWINGS

The preferred embodiments of the invention will be described in relation to the accompanying drawings. In the drawings, the following figures have the following general nature.

DETAIL DESCRIPTION OF THE INVENTION

Figure 1:
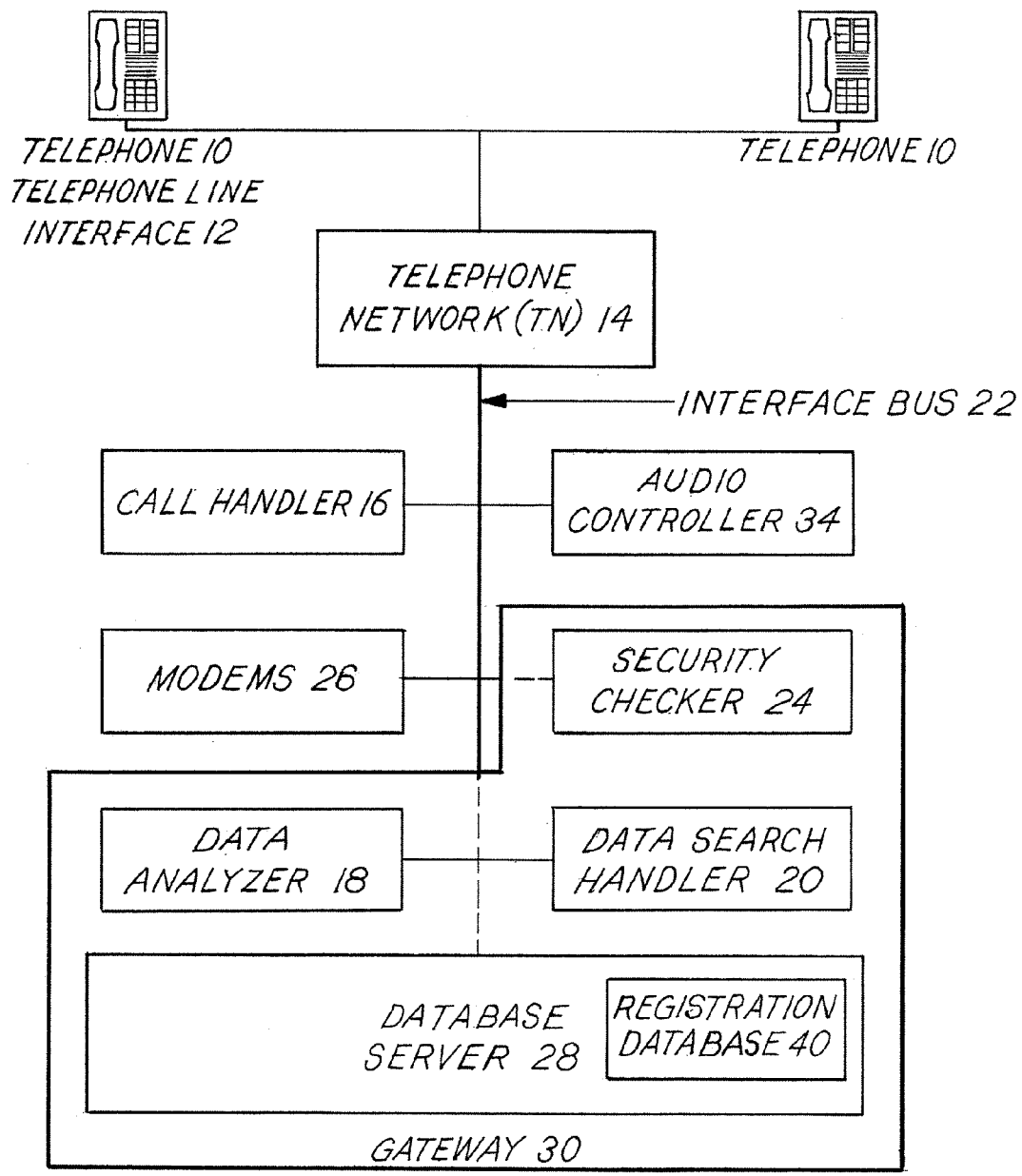
FIG. 1 is a block diagram to illustrate the principles of the invention.

The present invention is a method and apparatus for using a telephone system to obtain certain information from a remote database. FIG. 1 is a schematic block diagram of the overall telephone system for use with the present invention. The telephone system includes a plurality of telephones 10 connected to a Telephone Network (TN) 14 by individual voice channels 12. The TN 14 includes typical telephone switching equipment that responds to coded signals of the telephones 10 and interacts with the callers. The telephone 10, voice channel 12, and TN 14 are standard telephone equipment and are well understood in the art. The telephone 10 is typically owned by a caller that calls into that system of the present invention. Telephone 10 may be any type of device for communicating via a TN 14. The voice channels 12 and TN 14 are typically owned by a telephone operating company and leased to the subscriber. The telephone 10 represents any number of calling devices, including but not limited to, cell phones, computing devices, and WOP-enabled phones.

Still referring to FIG. 1 and in accordance with the present invention, the telephone system includes a comprehensive remote data access apparatus 32, which may be any computing device. The apparatus 32 does not care where the call is coming from as long as the calling equipment can submit DMTF signals. In alternative embodiment, other forms of signaling may be used.

Remote data access apparatus 32 preferably has a call handler 16, a plurality of modems 26, an audio controller 34, and a gateway card 30 each interconnected via an interface bus 22. Call handler 16 is preferably a hardware card that is directly connected with the voice channel 12. The call handler 16 has a bi-directional communication with TN 14 via telephone line 12 and has bi-directional communication with the modems 26 via the interface bus 22. The call handler 16 interacts with the call receiving and forwarding the inputs provided by the caller and providing the necessary prompts to the caller. The audio call controller 34 also is preferably a hardware card that may be connected to the call handler 16. The audio controller 34 includes audio or microphone input lines and an auxiliary speaker output. The audio controller 34 is known in the telephone industry and serves to provide any audio response to the caller. The modems 26 are preferably a plurality of modulation and demodulation cards. The modems 26 may be, for example, any suitable modem as manufactured by US Robotics/3COMS. The modems 26 serve to receive the caller's DTMF inputs and convert the signals into a form that is recognizable by the apparatus 32. The gateway card 30 should be capable of handling multiple processes at a time and may be, for example, a Pentium II PC card having 256 Mbytes or higher RAM, 50 GB or higher memory and 586 MHz or higher speed. Those skilled in the art will appreciate that any other computing device such as a workstation may also be used as part of or including the gateway card 30.

The gateway card 30 includes a security checker 24, a data analyzer 18, and a data search handler 20, which are preferably software modules of the gateway card 30. The security checker 24 serves to manage the security of the apparatus 32 to ensure that only registered callers assess the information provided by the apparatus 32. The data analyzer 18 generally converts the data provided by the modem into recognizable ASII format data. The data search handler 20 serves to form search requests to search the database server 28.

The gateway card 30 includes a database server 28 that serves to store various information that may be provided a caller via the TN 14. In accordance with the present invention, the database server 28 has stored therein credit history information, and/or book availability information. The database server 28 also has stored therein an audio response corresponding to each piece of information stored therein. For example, where the database server 28 provides book availability information, the corresponding audio response may state whether or not the book is available.

In accordance with the present invention, a caller 10, who needs information about someone's credit report, someone's address/telephone, or book availability information, may call into the comprehensive automatic remote data access apparatus 32. The remote data access apparatus 32 receives dual-tone multi-frequency (DTMF) inputs from the caller 10 (to form a request for information) and sends voice responses (the requested information) back to the caller 10. When the caller 10 calls the remote data access apparatus 32, the apparatus 32 interactively guides the caller 10 to enter information as required by the apparatus 32 to perform a database search. The apparatus 32 performs a database search and provides a corresponding audio response back to the caller 10. The interaction and functionality of apparatus 32 is discussed in further detailed in conjunction with FIGS. 2, 3, 4, and 5. Access to the apparatus 32 may be the same as calling to a subscriber telephone line.

1. Credit Report

Figure 2:
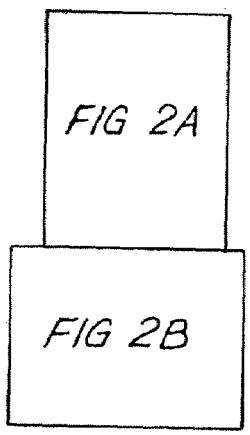
FIGS. 2A and 2B are exemplary flow charts depicting the process for obtaining credit report information using the telephone line in accordance with the present invention.

The following is a description for obtaining credit history information for an individual in accordance with one embodiment of the present invention. FIG. 2 is flow chart illustrating the steps for obtaining the credit card information for an individual. The user first calls into the apparatus 32. After connection is established between the telephone line 10 (user) and the apparatus 32, the apparatus 32 responds to the user with an initial welcome statement regarding the remote automatic data access of the credit report information. Apparatus 32 then requests the user to enter a personal identification number (PIN) to verify the user's registration. If the user is not registered, the registration procedure discussed below with relation to FIG. 6 may be followed. The user enters data using decimal code (base 10) and "Touch-call" or "Touch-tone." The call handler 16 receives the PIN and forwards it to the security checker 24 through the modem 26. The security checker 24 verifies the user's registration and sends the user's registration-related data back to the call handler 16. If the user is registered, then the call handler 16 proceeds with the user as discussed herein. If the user is not registered, then the call handler 16 using the audio controller 34 informs the user to register to the system. The registration method is explained further herein.

If the user is registered, the call handler 16 via audio controller 34 asks the user to form a request for information by entering data on the telephone keypad. The method in which the user enters information to form a request is discussed in further detail herein. For example, the call handler 16 queries the user to enter the first name of the person whose credit report is requested. Once the first name of the user is received, the call handler 16 using the audio controller 34 asks the user to enter various other information of the person whose credit report is requested. Such information may include, for example without limitation and in any order, the last name of the person whose credit report is requested, the person's social security number, the person's street number and street name, the person's city name, the person's state, and the person's zip. If the report is requested via facsimile, call handler 16 will request the user's fax number. Similarly, if the report is requested via mail, the call handler 16 will request the user's mailing address or e-mail address.

When the call handler 16 receives the request for information from the user, the request is passed from the call handler 16 to the data analyzer 18 via the modem 26. In particular, the request from the user is received by the call handler 16 in the form of DTMF entries. Call handler 16 collects the user-entered DTMF entries and passes them to the modem 26. The modem 26 decodes the DTMF tones by converting them into digits and passes the digits to the data analyzer 18. The data analyzer 18 converts the data from digits to ASCII alphabets to form the exact word provided by user. The data analyzer 18 then stores the ASCII information in a temporary file and sends it to the data search handler 20. The data search handler 20 receives the ASCII information until the complete request is received. The data search handler 20 then makes a Sequence Query Language (SQL) statement from the request to search the database server 28 for the requested information. In the case where the request seeks credit history information, the data search handler 20 will make SQL statements using the first name, last name, social security number, and address provided by the user. The database server 28 preferably has stored therein all of the available detailed credit history reports along with a corresponding audio summary of the credit report. For example, the audio summary may provide that the person's credit is "good," "bad," "worse," or "excellent."

The database server 28 either responds back to the data search handler 20 with a matched credit history report and the audio response or responds with a message that there was no match. This information is then sent back to the call handler 16. If the requested information was found, then the call handler 16 first sends the audio response to the audio controller 34. Upon the user's request the call handler 16 also faxes, mails, or e-mails the detailed credit history report to the user in accordance with the user's instructions. The user needs to enter e-mail address and/or fax # if the user want the fax and/or e-mail copy of the credit report. The system already has the mailing address from registration.

The database server 28 has stored therein a voiced response corresponding to each item in its memory. When a match is found, the voice response corresponding to the matched item in memory is forwarded to the audio controller 34 to send it to the user. If more than one match is found, all of the possible matches will be sent to the user. The matched respond will be given to the user with the user's input, e.g. the first name, last name, book name.

The audio controller 34 then asks whether the user wants to get another credit report. If no more reports are requested, then the call is disconnected.

2. Book Availability

Figure 3:
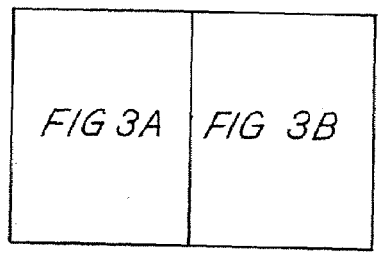
FIGS. 3A and 3B are exemplary flow charts depicting the process for obtaining book availability information using the telephone line in accordance with the present invention.

The following is a description for obtaining book availability information from a library or bookstore in accordance with the present invention. FIG. 3 is flow chart illustrating the steps for obtaining the book availability information. The user first calls into the apparatus 32. After connection is established between the telephone line 10 (user) and the apparatus 32, the apparatus 32 responds to the user with an initial welcome statement regarding the remote automatic data access of the book availability information. Apparatus 32 then requests the user to enter a personal identification number (PIN) to verify the user's registration. If the user is not registered, the registration procedure discussed below with relation to FIG. 6 may be followed. The user enters data using decimal code (base 10) and "Touch-call" or "Touch-tone." The call handler 16 receives the PIN and forwards it to the security checker 24 through the modem 26. The security checker 24 verifies the user's registration and sends the user's registration-related data back to the call handler 16. If the user is registered, then the call handler 16 proceeds with the user as discussed herein. If the user is not registered, then the call handler 16 using the audio controller 34 informs the user to register to the system. The registration method is explained further herein.

If the caller is registered, the call handler 16 using the audio controller 34 queries the user to form a request by entering the title of the requested book, the author, and/or the edition of the book. Book availability is searched from the database server 28. If the desired book was found, then the audio controller 34 sends a voice response to the caller informing the caller of the availability of the book. In this embodiment, the database server 28 may be coupled to a library or a bookstore to provide book availability for the entity.

3. Address and Phone Number

Figure 4:
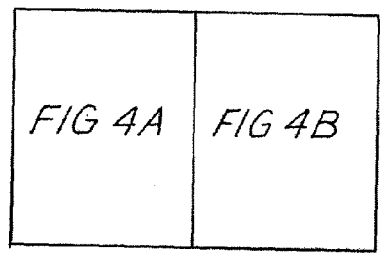
FIGS. 4A and 4B are exemplary flow charts depicting the process for obtaining address/telephone number information using the telephone line in accordance with the present invention.

The following is a description for obtaining individual or business addresses and, optionally, phone numbers in accordance with the present invention. FIG. 4 is flow chart illustrating the steps for obtaining individual or business addresses and phone numbers. The user first calls into the apparatus 32. After connection is established between the telephone line 10 (user) and the apparatus 32, the apparatus 32 responds to the user with an initial welcome statement regarding the remote automatic data access of the address and phone number information. Apparatus 32 then requests the user to enter a personal identification number (PIN) to verify the user's registration. If the user is not registered, the registration procedure discussed below with relation to FIG. 6 may be followed. The user enters data using decimal code (base 10) and "Touch-call" or "Touch-tone." The call handler 16 receives the PIN and forwards it to the security checker 24 through the modem 26. The security checker 24 verifies the user's registration and sends the user's registration-related data back to the call handler 16. If the user is registered, then the call handler 16 proceeds with the user as discussed herein. If the user is not registered, then the call handler 16 using the audio controller 34 informs the user to register to the system. The registration method is explained further herein.

If the caller is registered, the call handler 16 using the audio controller 34 asks the user to enter the first name, last name, city, and state of the person whose phone number or address is requested. If a phone number or address of a business is requested, then the user enters the name, city, and state of the business. Address and/or telephone number information is searched from the database server 28. If the address/telephone number was found, then the audio controller 34 sends a voice response to the caller.

4. Registration

Figure 5:
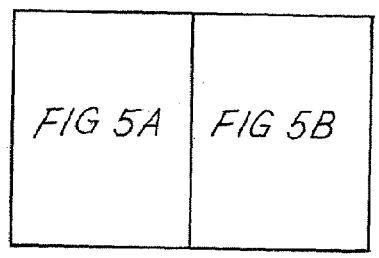
FIG. 5 is a flow chart depicting the process for registering with the present invention.
Figure 2A:
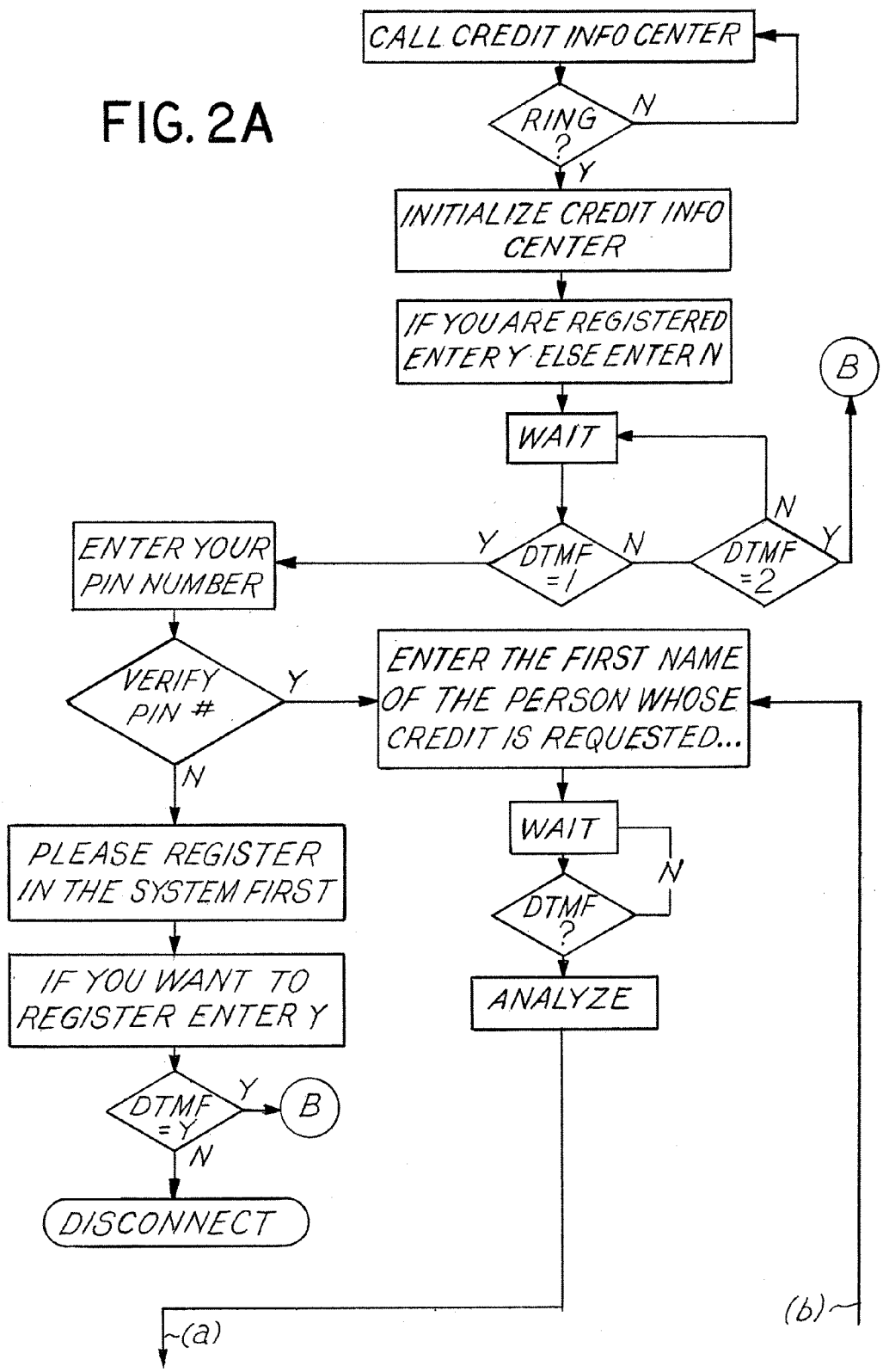
Figure 2B:
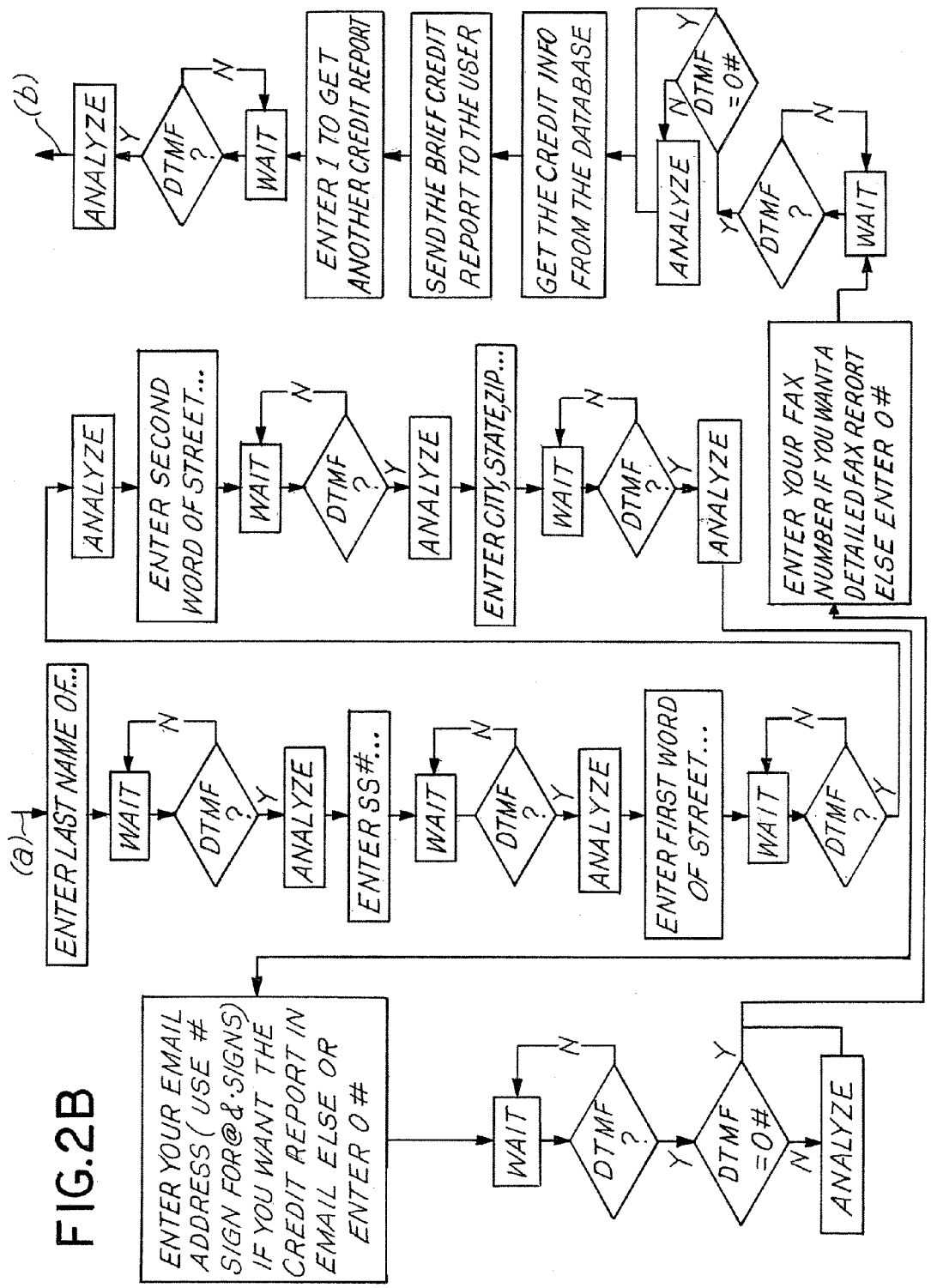
Figure 3B:
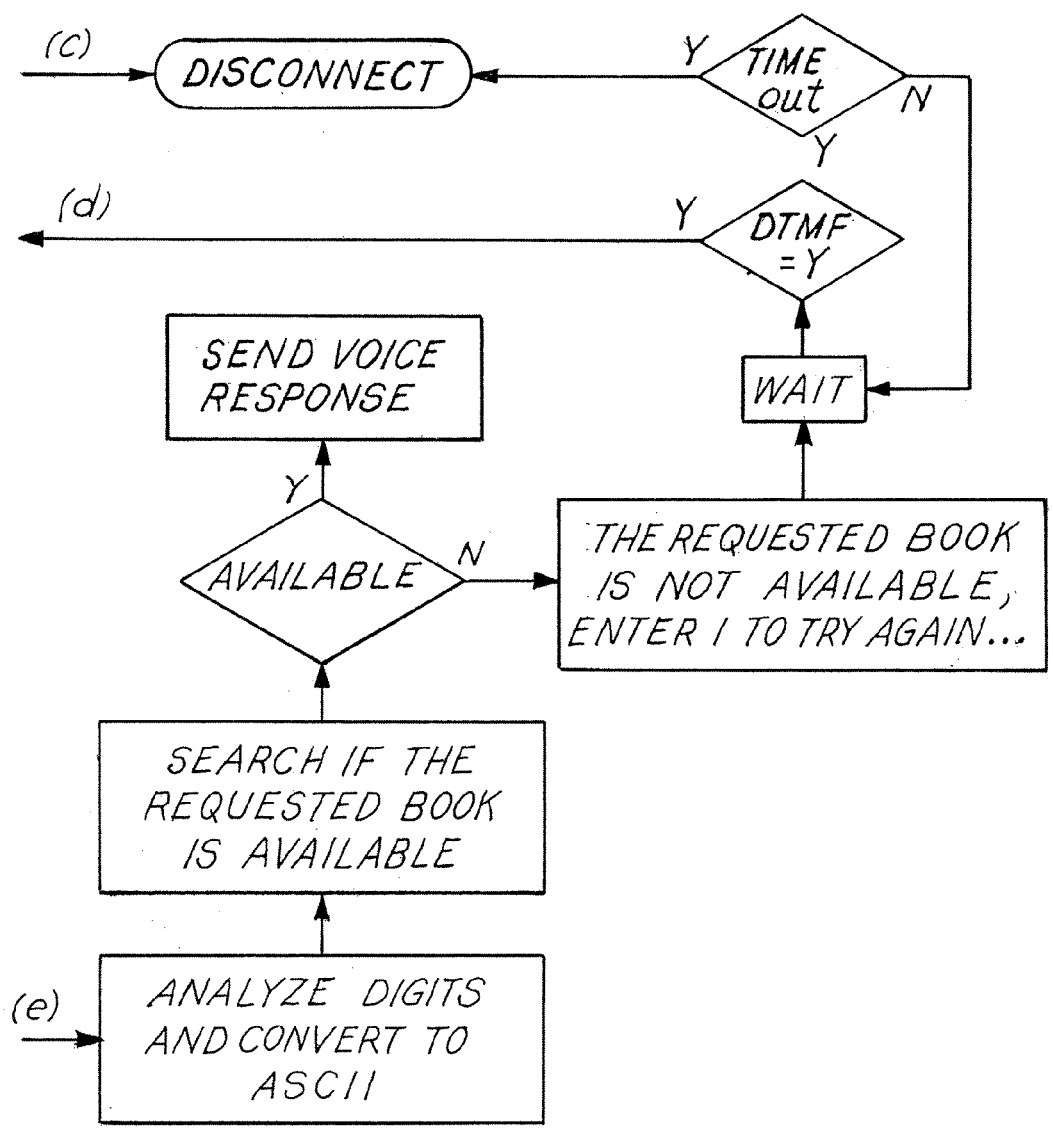
Figure 4A:
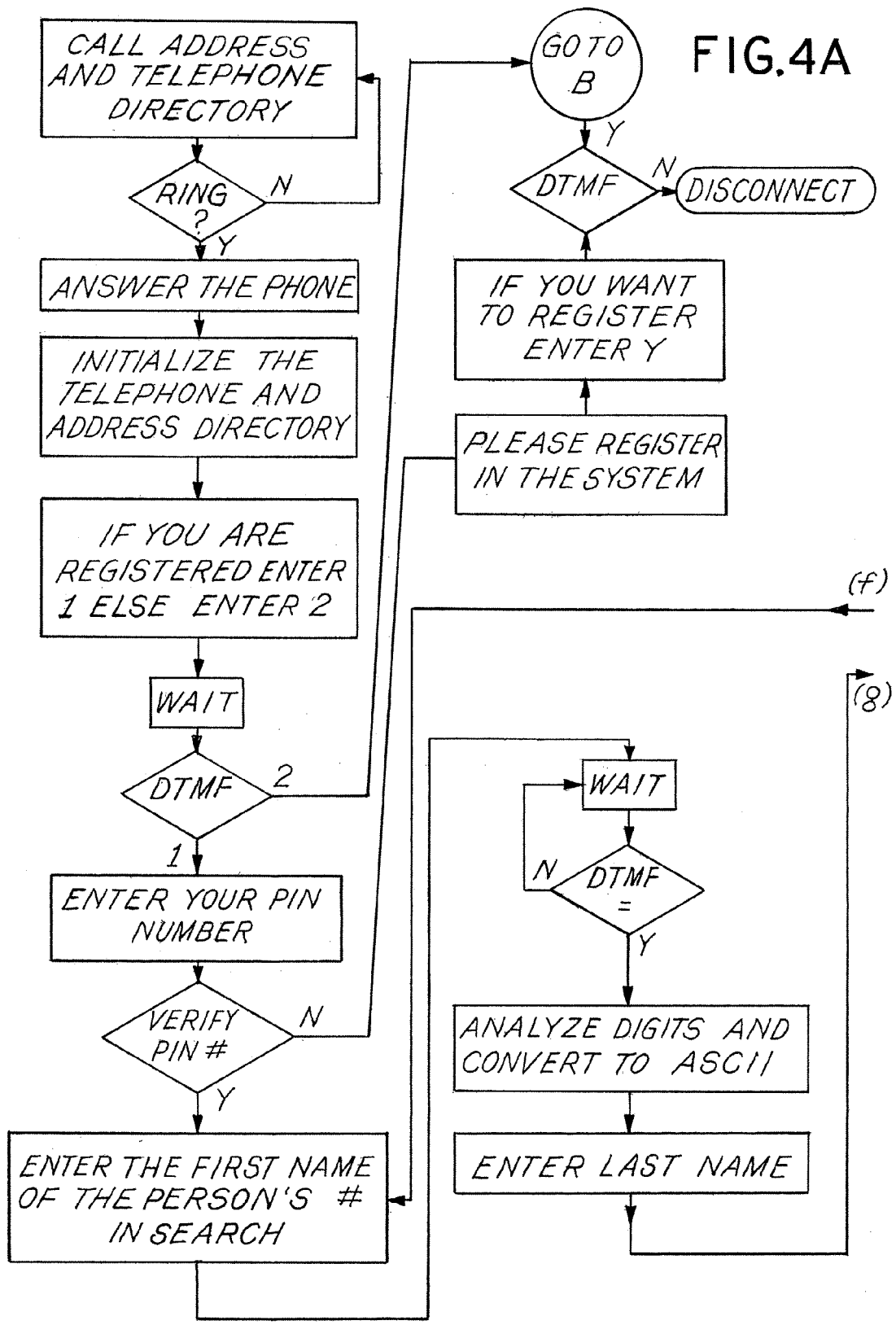
Figure 4B:
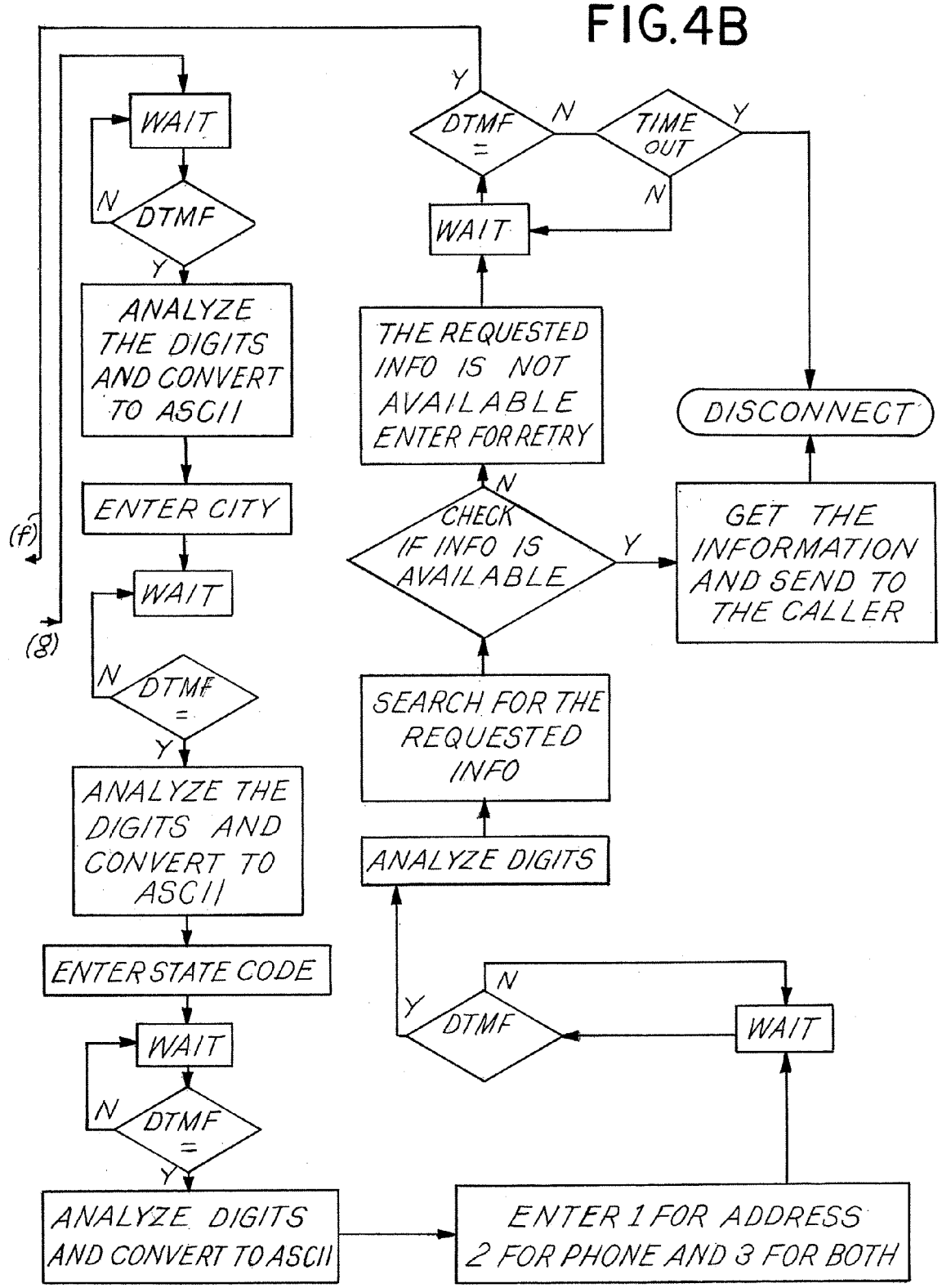
Figure 5A:
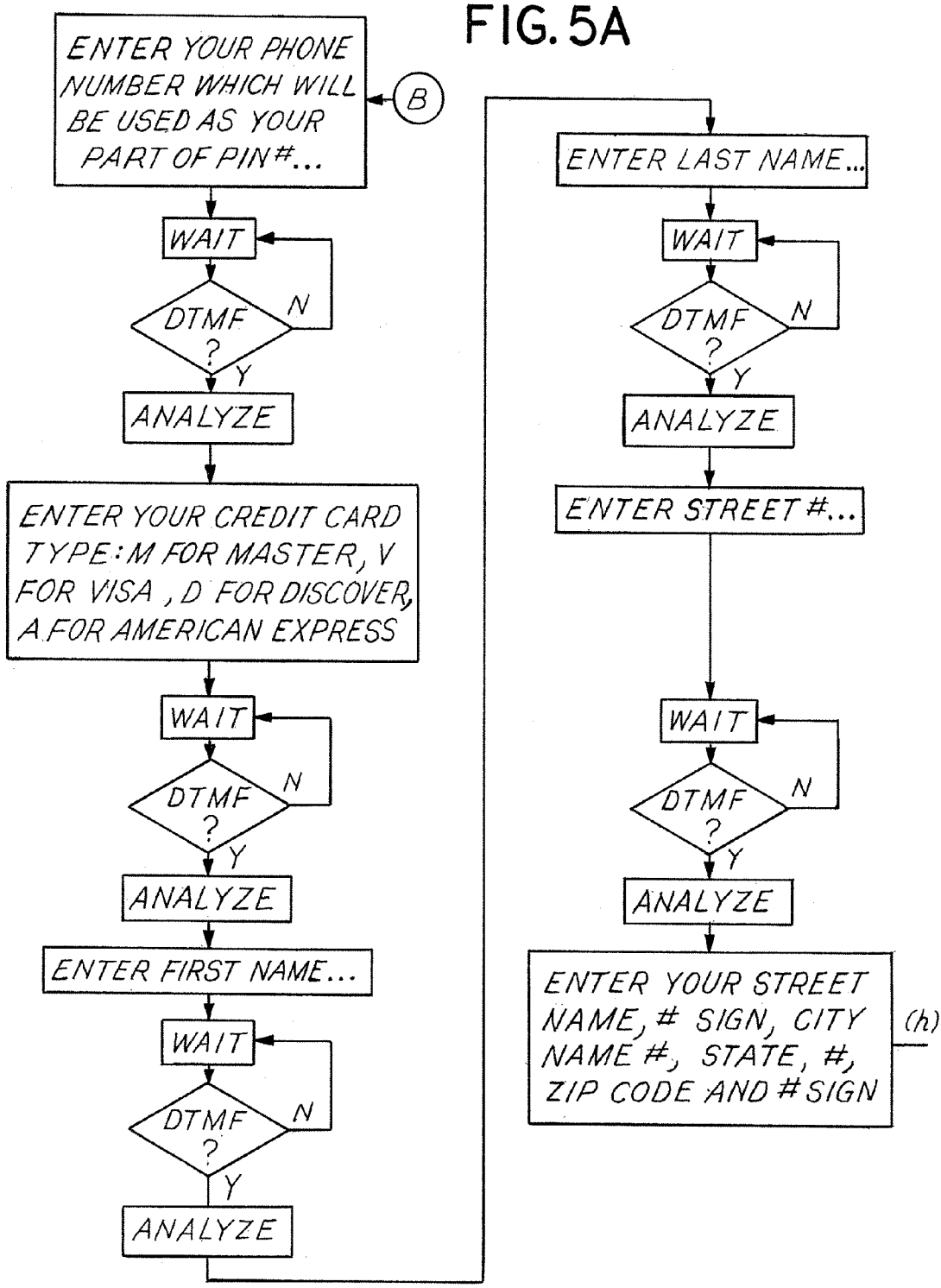

As shown in FIG. 5, the apparatus 32 will ask the user to enter the PIN (or phone number), credit card type, first name, last name, street number, street name, city, state, ZIP, credit card number, credit card expiration date, and Y or N to register. The data is entered using the method as shown in credit report section. The apparatus 32 will maintain this information in a registration database 40 (FIG. 1) for future record verification.

As discussed earlier, the user may enter information into the system using the keypad of a telephone. The request by the user is preferably entered by applying two digits for each letter, the first digit identifying the group of letters and the second digit identifying the particular letter within the group. For example, entry of the first number "2" on the telephone keypad identifies a group of letters consisting of "A," "B," and "4C." Entry of the second number "2" identifies the second letter in this group, namely "B." For example, entry of "21" identifies the letter A, "22" identifies the letter B, "23" identifies the letter C, "31" identifies the letter D, "32" identifies the letter E, "33" identifies the letter F, and so on. For letters S and Z, the user needs to enter "74" and "94," respectively. Advantageously, this leaves no ambiguity identifying the exact word entered by the user.

Although not required, the above alpha-numeric response is preferred over the other known methods since these other method create multiple possibilities and it slows system response time. Under the alpha-numeric system, since every letter has unique two-digit number pair, the risk of confusion or multiple possibilities is avoided. In addition, such an approach avoids ambiguity and system time.

Advantageously, the present invention provides a mechanism for users to access information from an automated system via the telephone network. The automated system is capable to serve multiple users at a time. To allow for greater callers, the above system may be upgraded as known in the art.

The preferred embodiments of the invention are now described as to enable a person of ordinary skill in the art to make and use the same. Variations of the preferred embodiment are possible without being outside the scope of the present invention. The examples of credit report, book availability status, address, and telephone number information are used to explain the method and a block diagram of the invention. For example, the same processes discussed above may be used to obtain any kind of information from a stored database using a telephone network. Therefore, to particularly point out and distinctly claim the subject matter regarded as the invention, the following claims conclude the specification.

I claim:

1. A system for obtaining credit history information of a person via a telephone network comprising in combination:

(a) an automated call handler coupled to the telephone network and capable of receiving a request for credit history information from a caller via the telephone network, querying the caller for details about the request, accessing the requested credit history information, and providing the requested credit history information to the caller in accordance with the request;

(b) an audio controller capable of providing outgoing audio messages from the call handler to the caller via the telephone network;

(c) gateway terminal coupled to the automated call handler and having a searchable database having stored therein credit history information, wherein the gateway terminal further has a security checker for ensuring access to the searchable database by authorized callers, and wherein the security checker processes security identification information entered by the caller to verify authorization;

(d) a plurality of modems for converting a dual-tone multi-frequency (DTMF) signal into one digit, wherein the caller selects only one DTMF entry for each character in a name and an address of the person to form a digit string; and (e) a data search handler that searches the searchable database by matching the digit string that corresponds to an actual name and address of the person.

2. The system of claim 1, wherein the gateway terminal further has a data analyzer for converting the digits into at least one American Standard Code for Information Interchange (ASCII) character.

3. The system of claim 1, wherein the gateway terminal further has a data search handler for searching the database based on the request provided by the caller.

4. The system of claim 1, wherein the call handler is capable of faxing the credit history information to the caller.

5. The system of claim 1, wherein the call handler mails the credit history information to the caller.

6. The system of claim 1, wherein the call handler e-mails the credit history information to the caller.

7. A system for obtaining book availability information via a telephone network comprising in combination:
   (a) an automated call handler coupled to the telephone network and capable of receiving a request for book availability information from a caller via the telephone network, querying the caller for details about the request, accessing the requested book availability information, and providing the requested book availability information to the caller in accordance with the request;
   (b) an audio controller capable of providing outgoing audio messages from the call handler to the caller via the telephone network;
   (c) a gateway terminal coupled to the automated call handler an having a searchable database having stored therein book availability information, wherein the gateway terminal further has a security checker for ensuring access to the searchable database by authorized callers, and wherein the security checker processes security identification information entered by the caller to verify authorization;
   (d) a plurality of modems for converting a dual-tone multi-frequency (DMTF) signal into one digit, wherein the caller selects only one DTMF entry for each character in a name and an address of the person to form a digit string; and
   (e) a data search handler that searches the searchable database by matching the digit string that corresponds to an actual name and address of the person.

8. The system of claim 7, wherein the gateway terminal further has a data analyzer for converting the digits into at least one American Standard Code for Information Interchange (ASCII) character.

9. The system of claim 7, wherein the gateway terminal further has a data search handler for searching the database based on the request provided by the caller.

10. The system of claim 7, wherein the audio controller converts the book availability into an audio response and the call handler provides the audio response to the caller.

11. A system for obtaining address information of an entity via a telephone network comprising in combination:
    (a) an automated call handler coupled to the telephone network and capable of receiving a request for address information from a caller via the telephone network, querying the caller for details about the request, accessing the requested address information, and providing the requested address information to the caller in accordance with the request;
    (b) an audio controller capable of providing outgoing audio messages from the call handler to the caller via the telephone network;
    (c) a gateway terminal coupled to the automated call handler and having a searchable database having stored therein address information, wherein the gateway terminal further has a security checker for ensuring access to the searchable database by authorized callers, and wherein the security checker processes security identification information entered by the caller to verify authorization;
    (d) a plurality of modems for converting a dual-tone multi-frequency (DTMF) signal into one digit, wherein the caller selects only one DTMF entry for each character in a name and an address of the person to form a digit string; and
    (e) a data search handler that searches the searchable database by matching the digit string that corresponds to an actual name and address of the person.

12. The system of claim 11, wherein the gateway terminal further has a data analyzer for converting the digits into at least one American Standard Code for Information Interchange (ASCII) character.

13. The system of claim 11, wherein the gateway terminal further has a data search handler for searching the database based on the request provided by the caller.

14. The system of claim 11, wherein the audio controller converts the address information into an audio response and the call handler provides the audio response to caller.

15. A system for obtaining credit history information of a person via a telephone network comprising in combination:
    (a) an automated call handler coupled to the telephone network and capable of receiving a request for credit history information from a caller via the telephone network, querying the caller for details about the request, accessing the requested credit history information, and providing the requested credit history information to the caller in accordance with the request;
    (b) an audio controller capable of providing outgoing audio messages from the call handler to the caller via the telephone network;
    (c) gateway terminal coupled to the automated call handler and having a searchable database having stored therein credit history information, wherein the gateway terminal further has a security checker for ensuring access to the searchable database by authorized callers, and wherein the security checker processes security identification information entered by the caller to verify authorization;
    (d) plurality of modems for converting a dual-tone multi-frequency (DTMF) signal into one digit, wherein the caller selects only one DTMF entry for each character in a name and an address of the person to form a digit string; and
    (e) a data search handler that searches the searchable database by matching the digit string that corresponds to an actual name and address of the person.

16. The system of claim 15, wherein the gateway terminal further has a data analyzer for converting the digits into at least one American Standard Code for Information Interchange (ASCII) character.

17. The system of claim 15, wherein the gateway terminal further has a data handler for searching the database based on the request provided by the caller.

* * * * *

UNITED STATES PATENT AND TRADEMARK OFFICE
CERTIFICATE OF CORRECTION

PATENT NO. : 7,162,015 B1
APPLICATION NO. : 09/737098
DATED : January 9, 2007
INVENTOR(S) : Kanu Patel It is certified that error appears in the above-identified patent and that said Letters Patent is hereby corrected as shown below:

On the title page, in field (57), under "Abstract", in column 2, line 6, after "includes" delete "a".

On the title page, in field (57), under "Abstract", in column 2, line 18, after "request," change "search" to --searches--.

Column 1, line 48, after "Young," delete "Smith,".

Column 2, line 13, after "to" insert --the--.

Column 2, line 23, before "same" insert --the--.

Column 5, line 1, after "callers" change "assess" to --access--.

Column 5, line 8, after "provided" insert --to--.

Column 6, line 21, after "by" insert --the--.

Column 6, line 47, before "the" change "want" to --wants--.

Column 6, line 55, before "will" change "respond" to --response--.

Column 8, line 11, after "and" change "4C." to --"C."--.

Column 8, line 21, before "create" change "method" to --methods--.

Column 8, line 23, after "has" insert --a--.

Column 8, line 29, after "for" change "greater" to --more--.

Column 8, line(s) 34-35, after "preferred" change "embodiment" to --embodiments--.

Column 8, line 58, in claim 1, before "gateway" insert --a--.

Column 8, line 66, in claim 1, after "of" change "moderns" to --modems--.

UNITED STATES PATENT AND TRADEMARK OFFICE
CERTIFICATE OF CORRECTION

PATENT NO. : 7,162,015 B1
APPLICATION NO. : 09/737098
DATED : January 9, 2007
INVENTOR(S) : Kanu Patel It is certified that error appears in the above-identified patent and that said Letters Patent is hereby corrected as shown below:

Column 9, line 33, in claim 7, after "handler" change "an" to --and--.

Column 9, line 40, in claim 7, after "of" change "moderns" to --modems--.

Column 10, line 42, in claim 15, before "gateway" insert --a--.

Column 10, line 50, in claim 15, before "plurality" insert --a--.

Signed and Sealed this

Eighteenth Day of August, 2009

David J. Kappos
*Director of the United States Patent and Trademark Office*